United States Patent
Olsson et al.

(10) Patent No.: US 6,535,254 B1
(45) Date of Patent: Mar. 18, 2003

(54) METHOD AND DEVICE FOR NOISE REDUCTION

(75) Inventors: Kent Olsson, Sundsbruk (SE); Ting Ting Zhang, Sundvall (SE); Youshi Xu, Sundvall (SE); Roger Andersson, Sundvall (SE)

(73) Assignee: Pinnacle Systems Inc., Mountain View, CA (US)

( * ) Notice: Subject to any disclaimer, the term of this patent is extended or adjusted under 35 U.S.C. 154(b) by 0 days.

(21) Appl. No.: 09/056,056

(22) Filed: Apr. 6, 1998

Related U.S. Application Data
(60) Provisional application No. 60/066,633, filed on Oct. 31, 1997.

(51) Int. Cl.[7] .......................... H04N 5/21; H04N 3/208; G06K 9/00
(52) U.S. Cl. .................. 348/607; 348/625; 382/199
(58) Field of Search ................... 348/607, 625, 348/620, 615, 616, 619; 382/199, 65, 194, 210, 221

(56) References Cited

U.S. PATENT DOCUMENTS

| | | | | |
|---|---|---|---|---|
| 4,573,070 A | * | 2/1986 | Cooper | 358/36 |
| 4,783,840 A | * | 11/1988 | Song | 382/54 |
| 4,962,542 A | * | 10/1990 | Klees | 358/54 |
| 5,208,673 A | | 5/1993 | Boyce | 358/167 |
| 5,294,984 A | * | 3/1994 | Mori et al. | 348/551 |
| 5,394,192 A | | 2/1995 | Hackett | 348/619 |
| 5,404,178 A | | 4/1995 | Kondo et al. | 348/618 |
| 5,442,407 A | * | 8/1995 | Iu | 348/620 |
| 5,491,519 A | | 2/1996 | Kim | 348/620 |
| 5,585,859 A | | 12/1996 | Ward et al. | 348/619 |
| 5,598,226 A | * | 1/1997 | Kokoram | 348/607 |
| 5,606,631 A | * | 2/1997 | Weiss et al. | 382/275 |
| 5,946,416 A | * | 8/1999 | Akagi et al. | 382/194 |
| 5,959,693 A | * | 9/1999 | Wu et al. | 348/624 |

FOREIGN PATENT DOCUMENTS
WO    WO 95/05717    2/1995    ............ H04N/5/44

\* cited by examiner

*Primary Examiner*—Andrew Faile
*Assistant Examiner*—Reuben M. Brown
(74) *Attorney, Agent, or Firm*—Timothy Platt

(57) ABSTRACT

A method of reducing noise in a video signal which includes a plurality of video frames being composed of a plurality of pixels, the method comprising the steps of: comparing video information contained in a current video frame and a plurality of temporally adjacent video frames; selecting from the current video frame and the adjacent video frames the video information that according to a predetermined condition is likely to be correct for the current video frame; and finally assigning the selected video information to the current video frame to thereby produce a video frame wherein noise has been reduced.

14 Claims, 5 Drawing Sheets

METHOD AND DEVICE FOR NOISE REDUCTION

PRIORITY INFORMATION

This application claims the benefit of provisional application No. 60/066,633, filed Oct. 31, 1997. This application claims Paris Convention priority under 35 U.S.C. § 119 from Swedish patent application nos. SE 9703234-6, filed on Sep. 8, 1997 and SE 9701251-2, filed on Apr. 4, 1997. A CD-ROM containing a computer program listing appendix has been submitted and is herein incorporated. The computer-readable compact disc (IBM-PC, MS-WINDOWS, 8751753.doc, 62 KB, Apr. 18, 2002, 09-37 and P10352 as filed.doc, 108 KB, Apr. 18, 2002, 09.38 is submitted in duplicate herewith, containing the computer program code of Examples 1–5 of the specification.

FIELD OF THE INVENTION

The present invention relates generally to noise reduction in digitized pictures and specifically to the reduction of noise in a video signal.

BACKGROUND OF THE INVENTION

Noise reduction of a video signal is used to enhance the quality of images comprising the video signal and to prepare for an efficient compression of the video signal. Noise reduction is important in connection with compression of image information, because noise may significantly reduce the effectiveness of compression schemes, particularly frequency-domain compression schemes such as MPEG-2. In image compression technology there is typically a trade-off between compression and image quality; increased compression may tend to reduce image quality. It is not always easy to reconcile these differences so as to achieve high quality highly compressed images. Effective noise reduction in connection with compression of a video signal may well serve both purposes and produce enhanced images in addition to a well-compressed video signal.

The technical background of compression and different state of the art preprocessing and compression techniques are described for example in John Watkinson, *Compression in Video & Audio*, Focal Press 1995, ISBN 0 240 51394, which is incorporated by reference.

A previously known video signal noise reduction system is described, for example, in U.S. Pat. No. 5,361,105 to Siu-Leong Iu, the content of which is hereby incorporated by reference. In this system, image pixels are tracked across multiple frames and are averaged to produce respective noise-reduced pixel values. In video signals representing a sequence of images that may change from frame to frame, e.g. in motion pictures and television, this system seeks to reduce noise by estimating the magnitude and direction of inter-frame motion in a sequence of image frames. The movement of an image is estimated by first calculating a trajectory vector for a block of picture elements (pixels) by comparing preceding and succeeding frames. The trajectory vector is then used to reduce noise in the video signal by averaging each of a plurality of pixels corresponding to a moving block along an estimated trajectory. The described method, however, does not eliminate noise to a satisfactorily sufficient degree. One drawback, for example, is that the trajectory estimation, which is a part of this noise reduction method, itself is sensitive to the noise.

Another system is disclosed in U.S. Pat. No. 4,987,481 to Spears et al., which is hereby incorporated by reference. Spears shows an apparatus for selectively reducing noise by non-recursively averaging video information contained in a sequence of video frames when the video information is found to be impaired by noise. A drawback with this method is the consequence of the averaging between video frames. The video information of a noise-reduced frame portion is calculated and original video information is lost even if it is correct and unimpaired by noise. Furthermore, with the above procedure there is a high probability for different pixel values to appear or be introduced in sequence, which in its turn leads to poorer compression of the images in the video stream.

SUMMARY OF THE INVENTION

The object of and the problem to be solved by the present invention is to reduce the noise in a video signal representing a sequence of video frames, in particular a video signal representing moving pictures. An aspect of this problem is to achieve an enhanced compression factor for a compression scheme applied to the video signal, or stated differently, to reduce the bit rate of the video signal. A further aspect is to achieve an enhanced perceived image quality, preferably combined with an enhanced (or at least not reduced) compression factor.

Accordingly, the result achieved by the invention can be considered a form of noise reduction, or alternatively, video signal optimization for compression. The method of the invention is operative to remove or "smooth out" minor differences in a video signal, ordinarily imperceptible or only marginally perceptible to the human eye, so that certain types of data compression can be performed on the video data more efficiently. In particular, the well-known MPEG compression scheme uses coefficients in the frequency domain to represent small eight-by-eight pixel regions of an image. Given a constant target bit rate, eliminating many of the high-frequency components devoted primarily to "noise" will leave more bandwidth for the low-frequency components of the compressed MPEG video stream, thereby leading to a possible increase in perceived image quality.

The invention is based on the discovery that there is a relationship or correlation between video information of frame portions within an observed video frame (i.e. a spatial correlation) on one hand, and between video information of frame portions from a sequence of adjacent observed video frames (i.e. a correlation along the time axis of the frame sequence) on the other hand. The correlation is strong in sequences of frame portions where there is no local scene change or movement in the image. A local scene change in this context means that the video information changes significantly between sequential corresponding frame portions, i.e. over time.

For a two-dimensional video signal, the correlation analysis is carried out in three dimensions, i.e. with respect to the surrounding pixels that are adjacent to the current pixel in the two-dimensional spatial domain and in the time domain, respectively. In order to distinguish between a pixel that represents a local scene change (e.g. an edge of a moving object within the image or a cut to another scene) and a random pixel or noise spike, the correlation between the current pixel under consideration and its surrounding pixels is analyzed. Noise on the current pixel, if any, is suppressed on the basis of the correlation analysis. If there is a weak correlation, a local scene change is assumed to take place between compared frame portions, and no attempt is made to reduce noise on this pixel. If, on the other hand, a strong correlation is found between compared frame portions, typically two frame portions, those frame portions qualify for further processing in a selecting step, with possible subsequent noise reduction.

According to the invention, the noise on a pixel is preferably replaced by a maximum likelihood signal based on correlated pixels. Stated differently, from a subset of the values of correlated pixels, the pixel that has a value which is most likely to have a similar predecessor or successor is selected to replace the current pixel. Each video frame is processed under consideration of a sequence of video frames temporally adjacent to the current video frame. The temporally adjacent frames may in various embodiments be ahead of, come after, or surround the current video frame. In a preferred embodiment, the processing is performed for each pixel of a current video frame by observing a frame portion consisting of the current pixel and a number of surrounding, spatially adjacent pixels. Such a frame portion is called a slice S. Each current slice, or more specifically the video information of the slice, is compared to equal sized spatially corresponding slices of the adjacent frames. Such a set of temporally consecutive slices can be called a tube T. The tube T is analyzed in order to select the slices adjacent to the current slice that have a particularly strong correlation, i.e. the consecutive slices wherein there is no local scene change.

Having selected a set of temporally consecutive slices that do not have a local scene change, the current pixel is compared to the spatially corresponding but temporally adjacent pixels of the selected slices (a subset of the original slices) and the pixel that is most likely to have a preceding or subsequent pixel having the same value or video information content is selected as a new current pixel. In a different wording, an extreme pixel value is sorted out and is replaced by a pixel selected from a set of adjacent pixels and being judged to have a better correlation to the surrounding pixels. The selected pixel is then assigned to the current pixel.

In one embodiment, the pixel judged to have a desired correlation, and which is assigned to the current pixel, is a pixel having the median luminance value of the pixels in the selected slices forming a tube of slices that is defined by two" local scene changes (i.e. "before" and "after the current scene).

In one embodiment, an entirely new sequence of video frames is produced in the noise reduction process, whereas in another embodiment, the current video frame is replaced by the new frame which thus may contribute in the analysis and processing of the next current video frame.

When the invention is applied as a pre-processing tool for compression of an image signal, an object of the invention is to produce sequences of pixels having the same value, but without loss of significant image information. In advantageous cases, this leads to a number of subsequent similar or identical blocks of (e.g. 8×8) pixels which, when encoded in a subsequent coding stage, are highly compressed.

In a further embodiment, account is also taken of the fact that the human eye has differing sensitivity to light and dark and to the different colors red, green and blue. Noise-impaired pixels are then discriminated with regard to a dynamically computed noise threshold value, such that the precision in noise and scene change detection is adapted to the characteristics of human vision. For example, detailed changes are hard to detect or are even undetectable in dark and in very bright areas. By taking the human eye sensitivity into consideration while computing the noise threshold value, the bit rate may be reduced further in regions of frequency spectra, or color space where human is less sensitive to small differences. An image can be achieved which is subjectively perceived by the eye as enhanced, even though video information may actually be missing or noise actually is left in parts of the picture.

In other embodiments, a predetermined or fixed threshold value is selected and used for a chosen selected range or for the whole frequency range of the picture.

Further advantages and details of the invention will be seen from the following description of an embodiment of the invention with the aid of the accompanying drawings and in connection with the independent and dependent claims.

DETAILED DESCRIPTION OF THE INVENTION

Figure 1:
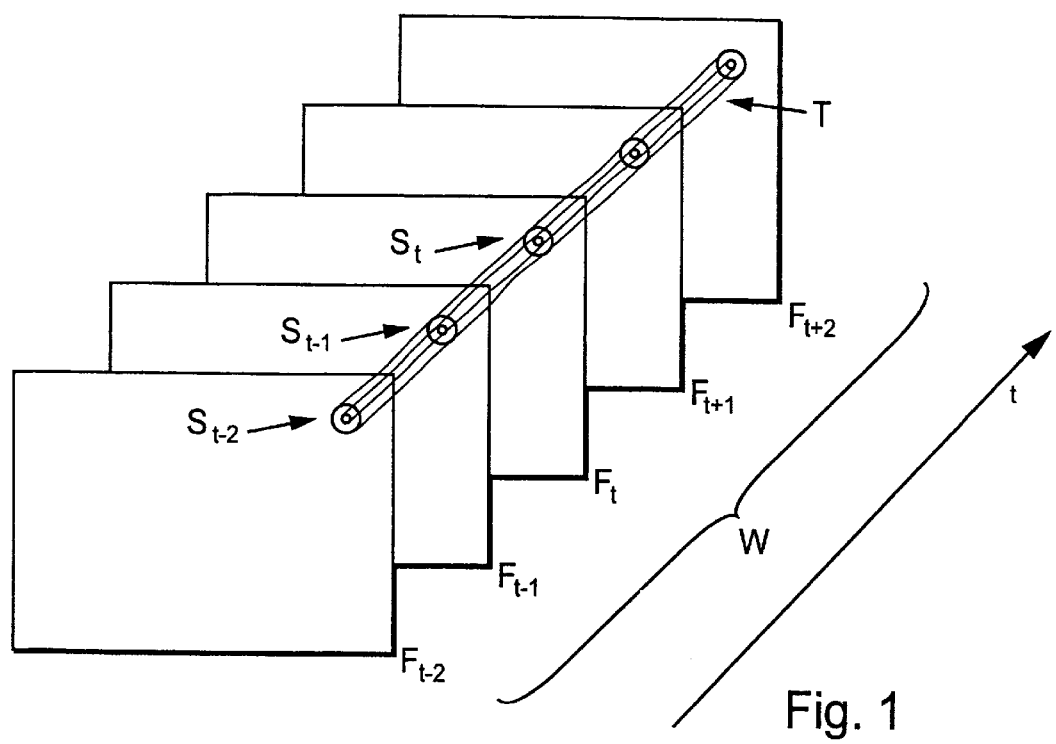
FIG. 1 shows a sequence of video frames illustrating the tube and slice concepts of the invention.
Figure 2:
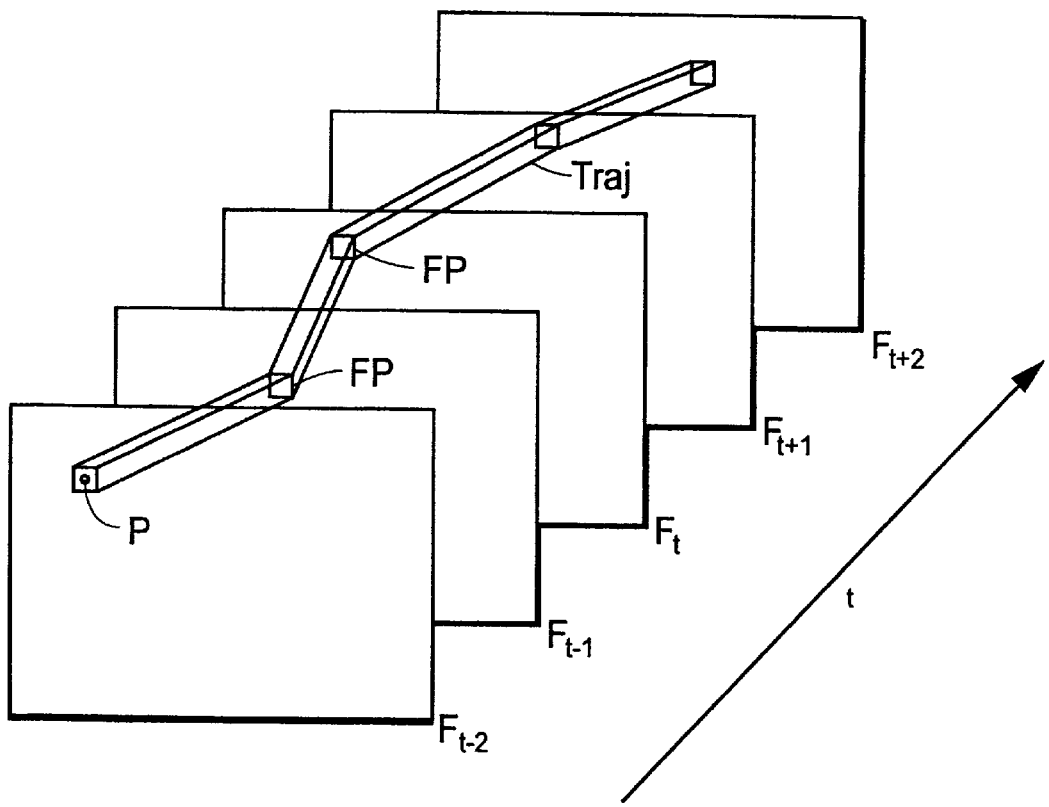
FIG. 2 depicts a sequence of video frames, a trajectory, and frame portions as used in a prior art noise-reduction scheme.

Referring initially to FIGS. 1–2, a video signal or an image signal comprises a sequence of video frames F wherein image information is stored in a spatial domain. In moving images, the video information basically changes from frame to frame along a time axis t. In the inventive method of FIG. 1, a video frame of digitized video information represented in a plurality of pixels P is processed portion by portion, where a frame portion typically would comprise at least one currently processed pixel and a number of adjacent pixels.

In a prior art system, as shown in FIG. 2, a trajectory Traj of frame portions FP is calculated, and serves as a description of the path of a moving image object that is moving across a set of frames as a function of time. Such a trajectory is estimated in U.S. Pat. No. 5,361,105. Noise reduction is carried out by first tracking moving image pixels P to estimate their trajectory and then producing a supposedly noise-reduced pixel value for the tracked pixel. This model can be less efficient than desired, because the process of estimating moving images involves complex calculations which can be slow, and the model is itself sensitive to noise. The invention carries out noise reduction processing without this kind of motion estimation or trajectory tracking.

In the invention, a number of frame portions called slices S (FIG. 1), preferably comprising a number of pixels P having corresponding spatial positions in a window W, a sequence of temporally adjacent frames F, are observed. Unlike the trajectory model, such a set of slices (called a tube T), is parallel to the time axis t. Each pixel is associated with some kind of color data, e.g. for each of the primary colors red R, green G and blue B, also referred to as RGB. Naturally, other image data or color representations are also possible within the inventive concept.

For the purpose of the description of the invention, the following expressions and corresponding mathematical notation are used. The meaning of the expressions is also clarified by way of the figures.

Frame: $F(t)=\{R(t), G(t), B(t)\}$
is a frame signal matrix of RGB values at the t:th frame.
Pixel: $P(i,j,t)=\{R(i,j,t), G(i,j,t), B(i,j,t)\}\epsilon F(t)$
is a picture element in frame F(t), with the position coordinates i,j In the t:th frame.

Luminance: $Y(i,j,t)$
is the luminance of the pixel P(i,j,t). The luminance Y can be calculated by means well-known in the art, for example, from the RGB values of the pixel P.

Figure 3:
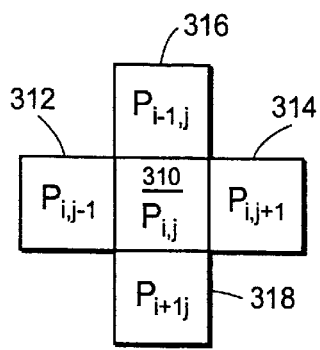
FIG. 3 shows an example of a slice used in one embodiment of the invention.

Slice: $S(i,j,t)$
is a collection of pixels forming a subset of the t:th frame. It forms a designed spatial window or 'slice'. In preferred embodiments, a slice includes the center pixel P(i,j,t) and some surrounding pixels P(i',j',t). The notation i',j',t' means a position or time reference being adjacent (in time, space, or both) to a currently processed pixel. FIG. 3 shows an example of a slice in the form of a cross having a current pixel $P_{ij}$ in the center position.

Window: $W(t)=\{F(\tau)|t-d \leq \tau \leq t+d\}$
is a set of consecutive frames, where d is a positive integer. F(t) is the center frame and (2d+1) is the size of a sliding "time-window" of consecutive frames. The term τ represents a time, as defined by the expression, and generally indicates a range of frames (F) from time t−d to time t+d.

Tube: $T(i,j,t)=\{S(i,j,t)|t-d \leq \tau \leq t+d\}$
is a collection of slices, or a three dimensional 'time-tube' of pixels. It typically consists of (2d+1) consecutive "slices", one from each of the consecutive frames belonging to the time-window W(t). In one embodiment, a tube typically includes the center "slice" S(i,j,t) and its adjacent-in-time 2d "slices" S(i,j,t').

As will be discussed in further detail below, in one embodiment of the invention each pixel is processed generally as follows. First, a number of temporally adjacent pixels that have a strong correlation (i.e. that are not involved in a local scene change) is determined. Second, from the set of strongly correlated temporally adjacent pixels, a pixel value that is most likely to have a predecessor or successor of equal or similar value is selected. Third, the currently processed pixel is replaced with the selected pixel.

The process of identifying the correlated pixels, i.e. the scene change analysis, is in one embodiment carried out by observing a slice containing the current pixel and spatially adjacent pixels, i.e. a slice S(i,j,t), as well as a number of spatially corresponding but temporally adjacent slices S(i,j, t'). The slices may for example consist of a center pixel P(i,j) and a selected number of the closest adjacent pixels P(i,j) forming a shape, e.g. a square, a cross or any other selected shape of pixels. A geometric shape is preferred. In one embodiment of the invention (illustrated in FIG. 3), a slice S comprises five pixels in a cross shape. A center pixel 310, represented by $P_{ij}$, is flanked horizontally by a left pixel 312 (at $P_{i,j-1}$) and a right pixel 314 (at $P_{i,j+1}$), and is flanked vertically by a top pixel 316 (at $P_{i-1,j}$) and a bottom pixel 318 (at $P_{i+1,j}$). The cross-shaped configuration of FIG. 3 has been found to provide good results while minimizing computational complexity.

A more detailed exemplifying embodiment of the invention comprises the following features and steps:

(a) Receiving as an input a video signal which includes a plurality of video frames of digitized video information represented in a plurality of pixels.

(b) Storing a current video frame and a plurality of temporally adjacent video frames, typically an uneven number of video frames, e.g. seven frames, surrounding a centrally positioned and currently processed frame.

(c) Selecting from the current video frame a current frame portion, i.e. a slice S(i,j,t) comprising a current pixel P(i,j) and at least one pixel spatially adjacent to the current pixel. In a preferred embodiment, cross-shaped slices (as shown in FIG. 3) are used, assuming there is at least some degree of spatial correlation between the pixels of the slice.

(d) Selecting from the temporally adjacent video frames temporally adjacent frame portions, i.e. slices, comprising a pixel or pixels that spatially corresponds to the pixels of the current frame portion. In other words, a collection of consecutive slices S(i,j,t') making up a tube T (FIG. 1).

(e) Determining the luminance value of each pixel in the current slice and the adjacent slices, i.e. in all slices of the selected tube.

(f) Determining the average luminance value of the current slice and the temporally adjacent slices, i.e. by averaging the luminance values of the pixels comprised in the frame portions.

The foregoing steps can be seen as a preparation for making a subsequent correlation analysis, and more specifically to determine whether a local scene change occurs between the slices of the tube. This is done by comparing the current frame portion and each of the adjacent frame portions by:

(g) Determining and comparing to a first threshold value the absolute value of the difference between the average luminance of the current slice and the average luminance of the adjacent slice. If the absolute value of the luminance difference exceeds the first threshold value, there is a local scene change in the video information between the current slice and the adjacent slice. In other words, if there is a large difference in luminance between adjacent frames, there is considered to be a local scene change between the current slice and an adjacent slice under consideration.

If the luminance difference is small, a further correlation test as follows:

(h) Determining and comparing to a second threshold value the absolute values of the difference between the values of a color component attribute (for example, red, green, or blue) of the current pixel and the corresponding pixel of the adjacent frame portion. If the absolute value of the color component value difference exceeds the second threshold value, there is a local scene change in the video information between the current slice and the adjacent slice. This second test involving color attributes is used to detect local scene changes where the luminance is more or less continuous despite a color change, which in effect is a local scene change. For example, where a scene change takes place, an object of one luminance may be replaced by an object having a similar luminance but a different color. In this case, the scene change should still be detected.

If these threshold tests are passed, it is determined that no local scene change occurs between the current slice and the adjacent slice, and the next pair of slices are analyzed until the whole tube has been processed. Thereafter, zero or an odd number of adjacent slices or frame portions is selected from the tube which are considered to involve no local scene change in relation to the current frame portion. This can also be expressed as selecting the largest possible sub-tube or sub-set of slices that does not involve a local scene change. For example, if the input tube comprises seven slices, a subset consisting of three, five, or seven slices can be selected, when as in this case a number of slices symmetrically surrounding the current slice are analyzed.

Thereafter, the actual noise reduction steps take place. This is preferably done by selecting the video information from a pixel that is most likely to have similar predecessors and successors, for example by:

(i) Comparing the luminance values of the current pixel and the corresponding pixels in the selected adjacent frame portions and selecting the video information attributes of the pixel having the median of the luminance values.

(j) Assigning the selected video information attributes to the current pixel to thereby produce a video frame having reduced noise. The noise reduction can be performed in different applications and embodiments either to enhance image quality or to achieve a required compression rate in an encoded image signal. In advantageous cases, the two purposes may be combined. By selecting the median value of the set of temporally adjacent pixels, anomalies such as noise spikes are filtered out. It is more likely that a current pixel taking on the attributes of pixel having the median attribute or attributes of a sequence of correlated pixels will be perceived to have a correct value, that is, it is more likely to match preceding or succeeding pixels.

Figure 4:
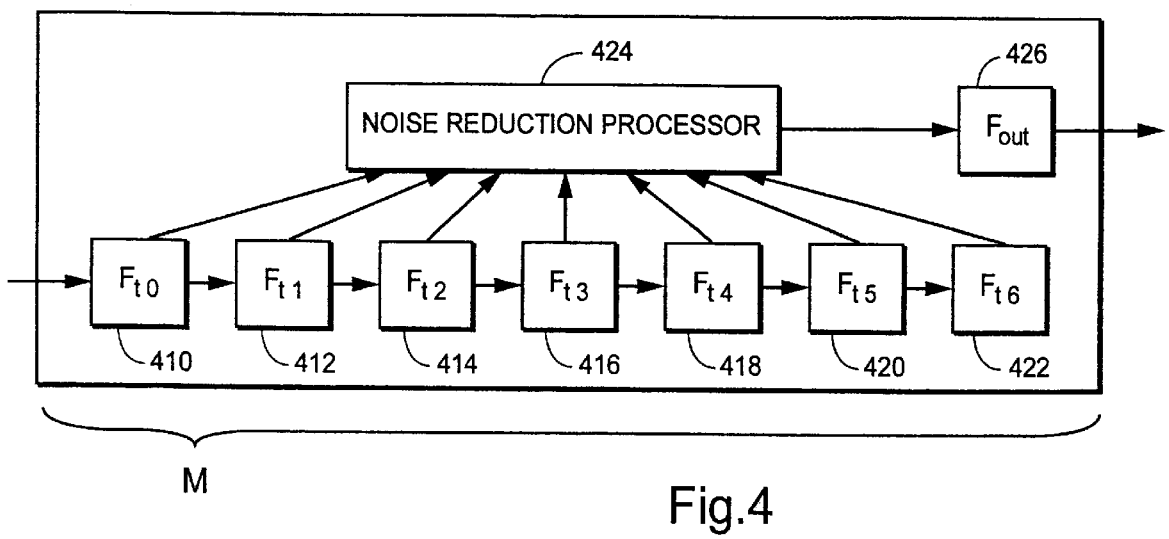
FIG. 4 shows a general view of an embodiment of the inventive noise reduction system and method, including storage for seven consecutive frames.

FIG. 4 shows one embodiment of the invention in which a memory M, for example a shift register, is provided to hold a number N+1 of first frames $F_{t0}$–$F_{tN}$ of an input video signal. In the illustrated example, seven frames $F_{t0}$ to $F_{t6}$ are shown (as frame storage blocks 410–422). As illustrated, $F_{t0}$ is the currently processed frame and $F_{t1}$–$F_{t6}$ the six following frames, which are also called 'look-ahead' frames. Each pixel P stored in each of the frames $F_{t0}$ to $F_{t6}$ contains color information, e.g. RGB attribute values. In another embodiment of the invention, the memory M holds a number of precedent frames $F_{t-d}$ and subsequent frames $F_{t+d}$ in addition to the current frame $F_{t0}$. All of the frame storage blocks 410–422 provide frame data to a noise reduction processor 424, which performs the steps set forth herein to accomplish noise reduction. As shown in FIG. 4, seven frames are used as input to create a single output frame 426. In a preferred embodiment, a maximum "tube depth" of seven frames has been found to balance the need for computational efficiency with the need to provide a sufficient number of frames to accomplish meaningful noise reduction.

Another embodiment of the invention comprises the following steps, which are repeated and carried out for each frame in a stream of frames of an input video signal.

(1) The color component attributes of each pixel in the frame, in the exemplifying embodiment red, green and blue, of a currently processed frame are individually compared to preferably all of the N succeeding values of the corresponding pixel in the subsequent look-ahead frames. If the differences in amplitude between a currently processed pixel $P_{t0}$ and a number of, and preferably all of, its succeeding pixels are below a predetermined threshold level, the value of the next pixel $P_{t1}$ is copied to $P_{t0}$, otherwise $P_{t0}$ is left unchanged.

Different threshold levels are specified and used for the different pixel components, thus taking account of differences in the sensitivity of the human eye to different wavelengths of the light. The fact that amplitude differences are compared to a minimum threshold value entails a discrimination between noise-impaired pixels and pixels belonging to a moving part of the image represented by the frame, whereby small changes in amplitude are reduced or eliminated. The choice of threshold level is dependent on the application of the invention, and it is within the scope of the invention to select or adapt threshold to other parameters than human eye sensitivity.

(2) When all pixels P in $F_{t0}$ have been processed according to step (1) above, frame $F_{t0}$ is transferred to an output. Using the exemplifying shift registers (the memory M of FIG. 4), the other N frames $F_{t1}$ to $F_{tN}$ are shifted to the left, so that $F_{t1}$ is copied to $F_{t0}$, $F_{t2}$ is copied to $F_{t1}$ and so on. A new $F_{tN}$ is taken into the memory M from an input frame stream of video signal. If there are no more frames at the input, the new $F_{tN}$ inherits the values of the old $F_{tN}$. Thereafter the next frame is processed according to step (1) above.

A further embodiment of the invention described in a mathematical notation may comprise the following steps for producing a noise filtered output pixel $P_{out}(i,j,t)$:

Step 1:

Calculating a luminance matrix $$\{Y_{in}(i',j',t')|\forall(i',j',t')\in T\}$$

Step 2:

Calculating the matrix of an indicate function I for the luminance differences between adjacent pixels, where $$\{I(i',j',t')|\forall(i',j',t')\in T\}$$

and where $$I(i',j',t') = \begin{cases} 0 & \text{if } |Y_{in}(i,j,t) - Y_{in}(i',j',t')| \leq E \\ 1 & \text{otherwise} \end{cases}$$

and E is the value of a designed threshold function $f_{thr}$ of the selected parameter components, in this example the color components, of the input pixel.

$$E = f_{thr}\{P_{in}(i',j',t') \in W_{in}(t)\}$$

If $I(i',j',t')=1$, the pixel is called an unequal pixel.

In one embodiment of the invention, the threshold function $f_{thr}$ is a constant, and E is consequently also a constant. However, in an alternative embodiment of the invention, the threshold function $f_{thr}$ can be related to the color or other attribute of the pixel $P_{in}(i,j,t)$ being compared, in order to tailor the threshold to the sensitivity of the human eye at different colors.

Step 3:

Calculating the number of unequal pixels in each slice $S(i',j',\tau)$ for $$\tau = t-d, t-d+1, \ldots, t+d \text{ separately}$$

$$\mu_{ij}(\tau) = \Sigma I(i',j',\tau)$$

where $(i',j') \in S(i,j,\tau)$

Step 4:

Calculating the number of unequal pixels in the three dimensional tube $T(i,j,t)$ $$\lambda_{i,j} = \sum_{t=t-d}^{t+d} \mu_{i,j}(\tau)$$

Step 5:
Determining the output pixel $$P_{out}(i, j, t) = \begin{cases} P_{in}(i, j, t) & \text{if } \lambda_{i,j} \leq \lambda_{tube} \text{ and } \forall \mu_{i,j}, (\mu_{i,j} \leq u_{slice}) \\ \tilde{P}_{in}(i, j, t) & \text{otherwise} \end{cases}$$

where $\lambda_{tube}$ and $\mu_{slice}$ are designed thresholds and $\tilde{P}_{in}(i,j,t)=P_{in}(i,j,t')$ for some t' at which $Y_{in}(i,j,t')$ is the median value of the set $\{Y_{in}(i,j,\tau)|t-d\leq\tau\leq t+d\}$. In other words, if there are a large number of unequal pixels in the tube or in each slice, then the input pixel is assumed to be noise, and is replaced with a pixel having median luminance.

When all the output pixels $P_{out}(i,j,t) \epsilon F_{out}(t)$ for different indexes (i,j) are obtained, a noise reduced frame $F_{out}(t)$ is completed. Then, a new frame is input and processed according to the above described steps.

Figure 5:
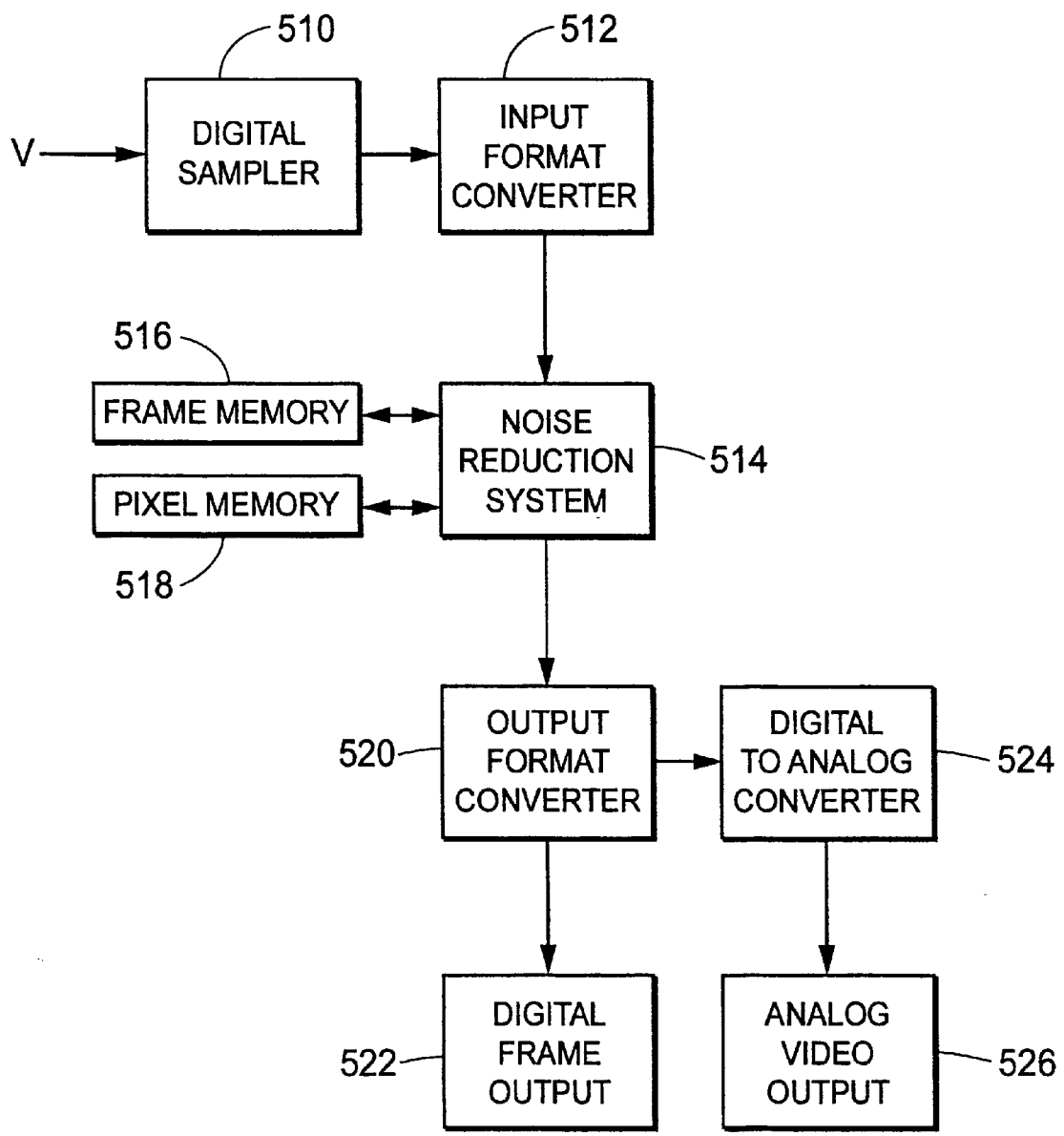
FIG. 5 shows an overview of a noise reduction system capable of performing the method of the invention.

FIG. 5 shows an overview of a system capable of accomplishing noise reduction on an analog video signal. The system accepts an analog video signal V, which is first sampled by a "frame grabber" or digital sampler 510 to convert the video signal V into the digital domain for further processing. The sampler 510 passes a digital signal representative of the analog video signal V to an input format converter 512, which identifies and separates the red, green and blue (RGB) components of each pixel of a sampled frame. Each RGB-separated frame is then passed to a noise reduction system 514, which processes the frames as described above to reduce the noise in the video signal V. As further described above, the noise reduction system 514 includes both frame memory 516 for storing a sequence of frames to be processed and pixel memory 518 for storing a set of pixels to be operated upon. After noise reduction, an output frame $F_{out}$ is fed from the noise reduction system 514 to an output format converter 520, which in one embodiment is provided with a digital frame output 522 for outputting a digital video output signal. In an alternative embodiment, the output format converter 520 is also provided with a digital to analog converter 524 and an analog video output 526 for outputting a modified analog video signal. In one embodiment, the output format converter 520 is provided with both kinds of outputs.

The invention can be realized by a hardware implementation or by a software implementation executed on an information processing apparatus, such as a work station, personal computer, signal processor or the like.

Figure 6:
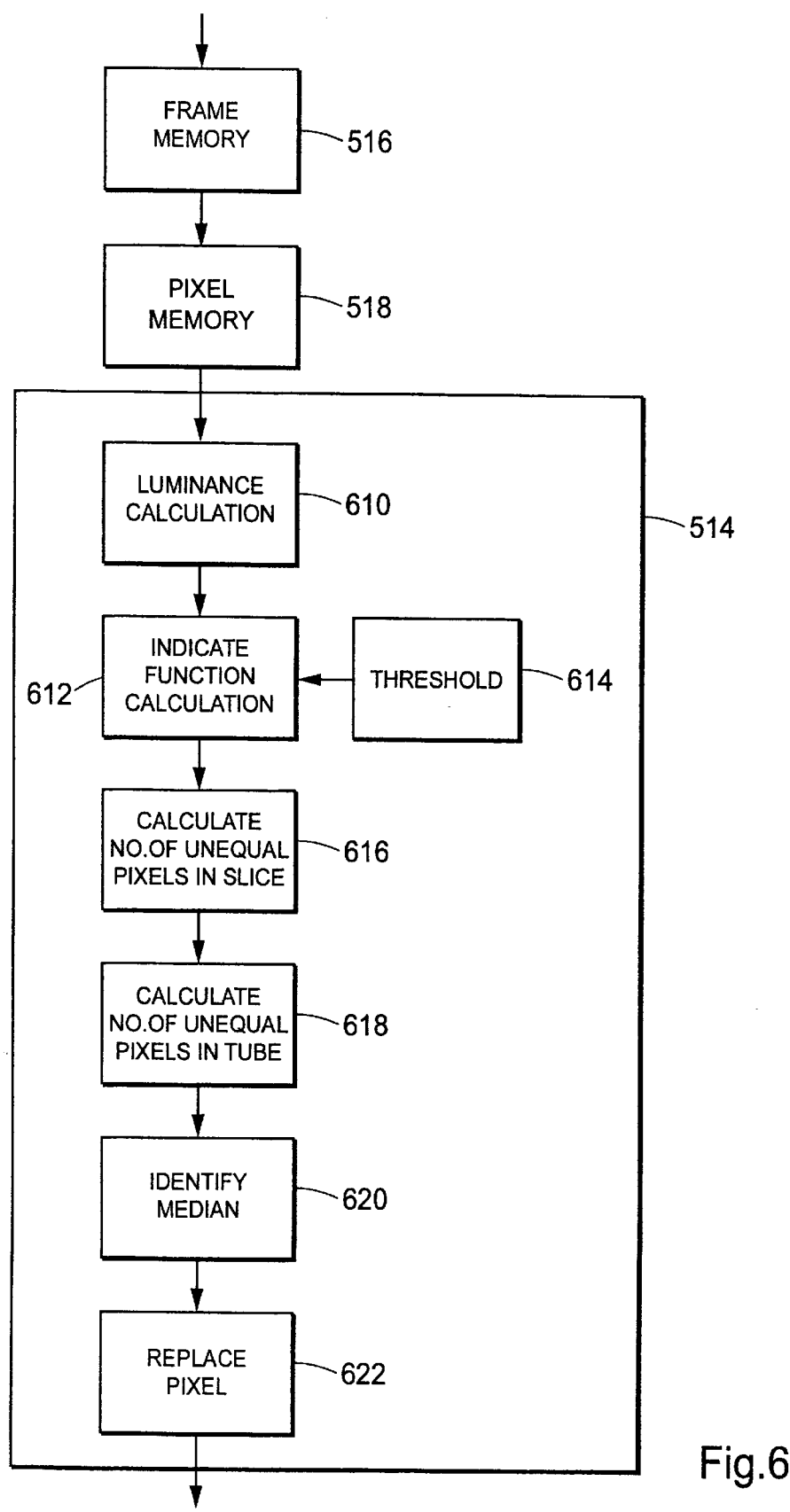
FIG. 6 sets forth the functional operations performed by one embodiment of the noise reduction system set forth as a portion of FIG. 5.

One embodiment of the noise reduction system 514 of FIG. 5 can be described in more detail with reference to the block diagram of FIG. 6. Frames received from the input format converter 512 (FIG. 5) are first sent to the frame memory 516 and the pixel memory 518. Both the frame memory 516 and the pixel memory 518 provide data as necessary in the subsequent functional steps set forth below. The noise reduction system 514 calculates a luminance matrix Y for a pixel matrix, namely the tube T, stored in the frame memory 516 and the pixel memory 518 (step 610). The noise reduction system 414 then calculates the luminance difference indicate function I (step 612) based on an input pixel (from the pixel memory 518) and a predetermined and stored threshold function 614 (which in one embodiment of the invention is a constant). The system 514 then calculates the number of unequal pixels in a slice (step 616), as described above, and further calculates the number of unequal pixels in the tube T (step 618). Based on these calculations, the system 514 identifies a pixel having a median luminance from among the slices in the tube T (step 620) and replaces the input pixel with the identified median pixel (step 622). This process is repeated for all of the input pixels in the frame.

Figure 7:
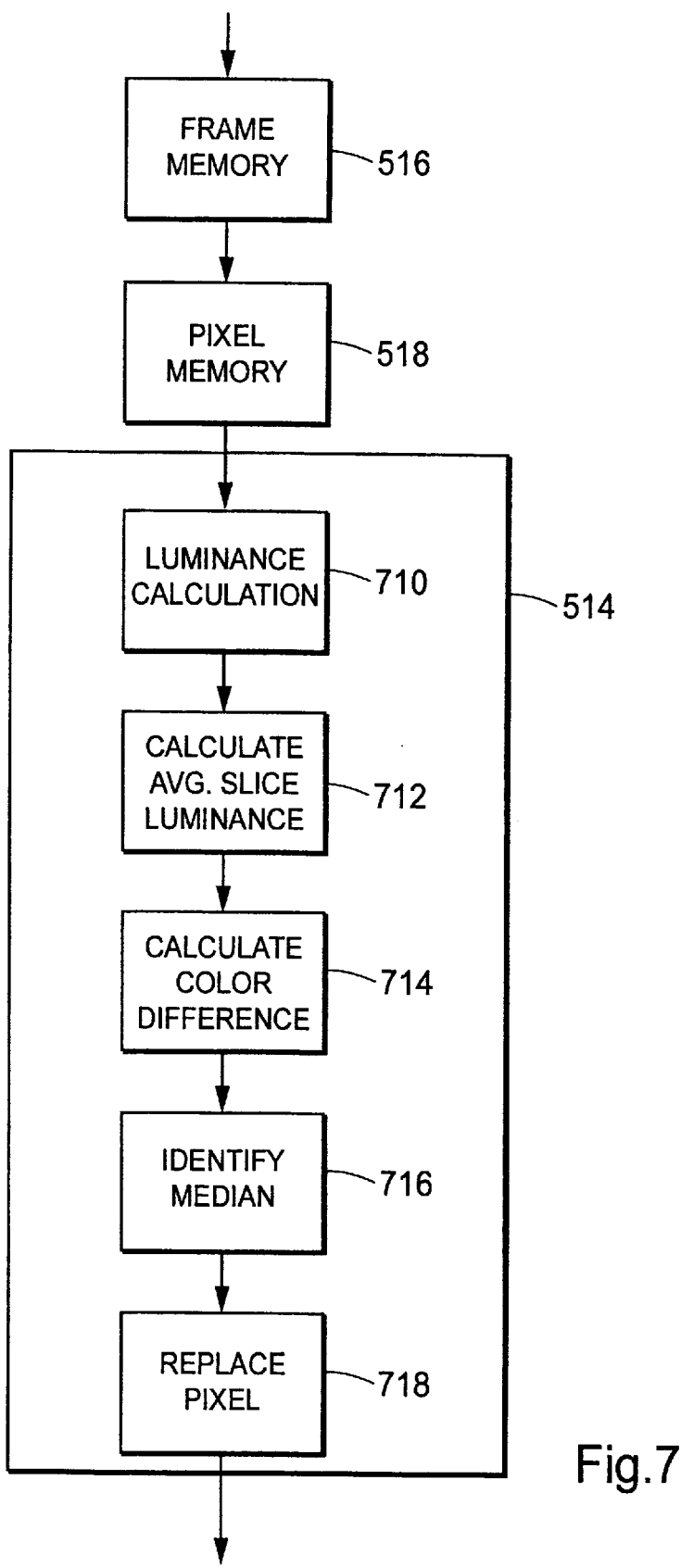
FIG. 7 sets forth the functional operations performed by an alternative embodiment of the noise reduction system set forth as a portion of FIG. 5.

An alternative embodiment of the noise reduction system 514 of FIG. 5 is shown in the block diagram of FIG. 7. Again, frames received from the input format converter 512 (FIG. 5) are first sent to the frame memory 516 the pixel memory 518. Both the frame memory 516 and the pixel memory 518 both provide data as necessary to the subsequent functional steps set forth below. The noise reduction system 514 calculates a luminance matrix Y for a pixel matrix, namely the tube T, stored in the frame memory 516 and the pixel memory 518 (step 710). The noise reduction system 514 then calculates an average luminance for each slice, and determines whether the average luminance discloses the existence of a local scene change (step 712). If not, the color of the input pixel (from the pixel memory 518) is compared to the corresponding pixel in another slice (step 714). If the tests indicate that there is no local scene change, then the system 514 identifies a pixel having a median luminance from among the slices in the tube T (step 716) and replaces the input pixel with the identified pixel (step 718). If there is a local scene change, then the identified median pixel (step 716) is the input pixel. This process is repeated for all of the input pixels in the frame.

Five exemplary computer software routines are provided as Examples 1 through 5. These Examples illustrate a preferred embodiment of the noise reduction invention.

Example 1 illustrates, in pseudocode, a modified version of an algorithm according to FIG. 7. As described above and in conjunction with FIG. 7, the Example 1 embodiment uses the average luminance of a slice to make noise reduction decisions, whereas the FIG. 6 embodiment counts "unequal pixels." This luminance implementation is less computationally intensive than the implementation that counts pixels.

Example 2, the TNR.CPP file, sets forth an implementation of the pseudocode of Example 1 in the C++ programming language. The pixel_sorter function is a set of routines capable of sorting, from lowest to highest, pixel attribute values in groups of three, five, or seven. Given the sorted pixel attribute values, the median_of function returns the attributes of the pixel having the median attributes from among the three, five, or seven returned by the pixel_sorter function. The same_scene function, as given, considers luminance only. This can produce some visible effects when luminance is unchanged, but color has changed (e.g. human skin on one frame followed by a blue object with the same luminance on the next frame). These effects can be limited by also considering color information to determine if the slice has changed (i.e., whether a scene change has occurred). The TNR function at the end of this software routine performs the entire algorithm, as described generally above and in Example 1.

Example 3 includes the C++ header file information, including data structures and function prototypes, used in the TNR.CPP file set forth in Example 2.

Example 4, TNR_UTIL.CPP, includes several C++ subroutines used in the TNR.CPP file set forth in Example 2. The function luma_computer computes the average of a slice's luminances. This is a group of routines, each of which is tailored for a specific purpose. For example, within a single slice, a pixel might have 2, 3 or 4 neighbors, and luminance cannot be derived from a non-existent pixel. The TNR_frame function computes the average luminance for the slice centered around each pixel. The function TNR_framestore sets up a sequence (or "window") of frames for processing by the invention. If there are too few frames in the sequence, the window is "padded" by repeating the first frame at the beginning of the window or the last frame at the end of the window, as necessary.

Example 5 is the header file information used by the TNR_UTIL.CPP file of Example 4. Specifically, TNR_UTIL.CPP sets forth various data structures used for frame and pixel storage by the method of the invention as implemented in these Examples.

The invention is described in connection which certain embodiments and examples which are not limiting. It will be appreciated that the invention may be be adapted or modified to suit different specific applications within the scope of the appended claims.

What is claimed is:

1. The method for reducing noise in a video signal that includes a plurality of video frames of digitized video information represented in a plurality of pixels, the method comprising the steps of:

storing a current video frame and a plurality of temporally adjacent video frames;

selecting from the current video frame a current frame portion comprising a current pixel and at least one pixel spatially adjacent to the current pixel;

selecting from the temporally adjacent video frames temporally adjacent frame portions comprising a pixel or pixels that spatially corresponds to the pixels of the current frame portion;

determining the luminance value of each pixel in said current frame portion and said adjacent frame portions;

determining the average luminance values of said current frame portion and said spatially adjacent frame portions;

determining and comparing to a first threshold value the absolute value of the difference between the average luminance of said current frame portions and the average luminance of said adjacent frame portion;

if the absolute value of the luminance difference exceeds said first threshold value, assuming there is a local scene change in the video information between said current frame portion and said adjacent frame portion; else determining and comparing to a second threshold value the absolute values of the difference between the values of a color component of said current pixel and the corresponding pixel of said adjacent frame portion;

if the absolute value of the color component value difference exceeds said second threshold value, assuming there is a local scene change in the video information between said current frame portion and said adjacent frame portion; else assuming that there is no local scene change between said current frame portion and said adjacent frame portion;

selecting an even number exceeding or equaling zero of adjacent frame portions considered to involve no local scene change in relation to said current frame portion;

selecting the video information from a pixel that is probable to have equal predecessor and/or successors by:

comparing the luminance values of said current pixel and the corresponding pixels in said selected adjacent frame portions and selecting the video information of the pixel having the median value of said luminance values;

assigning said selected video information to the current pixel to thereby produce a video frame wherein noise has been reduced.

2. The method according to claim 1, wherein the video information of the current video frame is replaced by the selected video information.

3. The method according to claim 1, wherein the selected video information is used to produce a new current video frame.

4. The method according to claim 1, wherein said plurality of temporally adjacent video frames are a predetermined number of video frames symmetrically preceding and/or succeeding a current video frame.

5. An apparatus for reducing noise in a video signal that includes a plurality of video frames, the apparatus comprising:

an input (22) for receiving an input frame of a set of input frames (Fin);

memory means (2) for storing one or more input frames (Fin);

memory means (3) for storing one or more pixels of a frame (F) to be processed;

means (24) for calculating a luminance matrix (Y) for a pixel matrix stored in the memory means (3);

means (26) for calculating a matrix (I) of a luminance difference indicate function dependent on a predetermined and stored threshold function (27);

means (28) for calculating the number of unequal pixels in a slice;

means (30) for calculating the number of unequal pixels in a tube (T);

means (32) for determining an output pixel (Pout); and an output (34) for outputting one or more noise reduced frames (Fout).

6. The apparatus according to claim 5, wherein said threshold function (27) is a constant value.

7. The apparatus according to claim 5, wherein said threshold function (27) is adapted to the sensitivity of a human eye for different colors.

8. The apparatus according to claim 5, wherein said threshold function (27) is dynamically computed, adapted to the characteristics of the human vision regarding the capability to detect detailed changes in very dark and very bright areas.

9. An apparatus for reducing noise in a video signal which includes a plurality of video frames of digitized video information represented in a plurality of pixels, the apparatus comprising:

means for storing a current video frame and a plurality of temporally adjacent video frames;

means for selecting from the current video frame a current frame portion comprising a current pixel and at least one pixel spatially adjacent to the current pixel;

means for selecting from the temporally adjacent video frames temporally adjacent frame portions comprising a pixel or pixels that spatially corresponds to the pixels of the current frame portion;

means for determining the luminance value of each pixel in said current frame portion and said adjacent frame portions;

means for determining the average luminance values of said current frame portion pixel and said spatially adjacent frame portions;

means for determining whether a local scene change occurs between said current frame portion and each of said adjacent frame portions by:
   means for determining and comparing to a first threshold value the absolute value of the difference between the average luminance of said current frame portion and the average luminance of said adjacent frame portion;
means for,
   if the absolute value of the luminance difference exceeds said first threshold value, assuming there is a local scene change in the video information between said current frame portion and said adjacent frame portion; else
   determining and comparing to a second threshold value the absolute values of the difference between the values of a color component of said current pixel and the corresponding pixel of said adjacent frame portion;
means for,
   if the absolute value of the color component value difference exceeds said second threshold value, assuming there is a local scene change in the video information between said current frame portion and said adjacent frame portion; else
   assuming that there is no local scene change between said current frame portion and said adjacent frame portion;
means for selecting an even number exceeding or equaling zero of adjacent frame portions considered to involve no local scene change in relation to said current frame portion;
means for selecting the video information from a pixel that is probable to have equal predecessor and/or successors by:
   comparing the luminance values of said current pixel and the corresponding pixels in said selected adjacent frame portions and selecting the video information of the pixel having the median value of said luminance values;
   means for assigning said selected video information to the current pixel to thereby produce a video frame wherein noise has been reduced.

10. The apparatus according to claim 9, comprising means for replacing the video information of the current video frame by the selected video information.

11. The apparatus according to claim 9, comprising means for producing a new current video frame from the selected video information.

12. The apparatus according to claim 10, wherein said plurality of temporally adjacent video frames are a predetermined number of video frames symmetrically preceding and/or succeeding a current video frame.

13. An apparatus for use in an image signal coding system for coding an input image signal into a compressed output signal, the apparatus comprising:
   means for receiving an input image signal devised to perform the method steps comprising digitized image data;
   adapted to perform the steps in accordance with claim 1;
   means for coding the image signal into a resulting compressed image signal, e.g. according to an MPEG compression scheme.

14. A computer program product for use in a computer system adapted for reducing noise in a video signal which includes a plurality of video frames, comprising:
   a recording medium;
   means, recorded on the recording medium, in accordance with the means of claim 1.

* * * * *